(12) United States Patent
Dirksen et al.

(10) Patent No.: US 12,348,367 B2
(45) Date of Patent: Jul. 1, 2025

(54) METHODS AND SYSTEMS FOR ON-DEMAND CELL SITE INVENTORY UPDATE RETRIEVAL

(71) Applicant: T-Mobile Innovations LLC, Overland Park, KS (US)

(72) Inventors: Jamir A. Dirksen, Casselberry, FL (US); Ivan Maldonado, Apopka, FL (US); Christopher C. Poirier, Titusville, FL (US); Paul Andrew Shinholster, Jr., Orlando, FL (US); Roger Wilbert, Oviedo, FL (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/457,234

(22) Filed: Aug. 28, 2023

(65) Prior Publication Data
US 2025/0080417 A1    Mar. 6, 2025

(51) Int. Cl.
*H04L 41/082*    (2022.01)
(52) U.S. Cl.
CPC .................................. *H04L 41/082* (2013.01)
(58) Field of Classification Search
CPC ..... H04L 41/082; H04L 41/22; H04L 67/306; G06F 9/45558; G06F 9/45541; G06F 9/5077

USPC .......................................................... 709/220
See application file for complete search history.

(56) References Cited

U.S. PATENT DOCUMENTS

| | | | |
|---|---|---|---|
| 11,871,443 B1* | 1/2024 | Betancourt | H04W 40/36 |
| 11,902,129 B1* | 2/2024 | Augustin | H04L 43/0817 |
| 12,057,994 B1* | 8/2024 | Gonzalez | H04L 41/0654 |
| 2024/0020145 A1* | 1/2024 | Qi | G06F 9/45541 |
| 2024/0028370 A1* | 1/2024 | Lan | G06F 9/5077 |

\* cited by examiner

*Primary Examiner* — Glenford J Madamba

(57) ABSTRACT

A method for on-demand cell site inventory update retrieval in a telecommunications carrier network comprises receiving, by an inventory application, updated component data associated with one or more components in a cell site, wherein the updated component data comprises a most up-to-date version of data describing the one or more components, storing, in a memory, a master inventory including data regarding a plurality of components in each of the cell sites in the RAN, and updating, by the inventory application, in the master inventory, records associated with each of the one or more components to include the updated component data when the master inventory excludes the updated component data associated with the one or more components.

20 Claims, 9 Drawing Sheets

METHODS AND SYSTEMS FOR ON-DEMAND CELL SITE INVENTORY UPDATE RETRIEVAL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication network operators build systems and tools to monitor their networks, to identify network elements (NEs) that need maintenance, to assign maintenance tasks to personnel, and to fix network elements. Operational support systems (OSSs) may be provided by vendors of NEs to monitor and maintain their products. When trouble occurs in NEs, the OSS and/or the NEs may generate an alarm notification. An incident reporting system may be provided by the network operator to track incident reports which may be assigned to employees to resolve one or more pending alarms. A network operation center (NOC) may provide a variety of workstations and tools for NOC personnel to monitor alarms, close incident reports, and maintain the network as a whole. It is understood that operating and maintaining a nationwide communication network comprising tens of thousands of cell sites and other NEs is very complicated. Moreover, each of the cell sites may include various types of equipment and may be running various software platforms, each of which may need to be separately maintained as an inventory.

SUMMARY

In an embodiment, a method for on-demand cell site inventory update retrieval in a telecommunications carrier network comprising a plurality of cell sites and a radio access network (RAN) is disclosed. The method comprises obtaining, by an inventory application executing on a computer system in the telecommunications carrier network, a request for an inventory update associated with a cell site of the plurality of cell sites, in which the request indicates a component in the cell site. The method further comprises receiving, by the inventory application from an operational support system (OSS) in the telecommunications carrier network, updated component data associated with the component in the cell site, in which the updated component data comprises a most up-to-date version of data describing the component. The method further comprises identifying, by the inventory application, a related component in the cell site that is at least one of communicatively coupled to the component in the cell site, installed at the component in the cell site, configured on a logical path with the component on the cell site, located proximate to the component on the cell site, or affected by the component in the cell site. The method further comprises receiving, by the inventory application, updated related component data associated with the related component in the cell site, in which the updated related component data comprises a most up-to-date version of data describing the related component, and updating, by the inventory application, a master inventory including data regarding a plurality of components in each of the cell sites in the RAN. The update to the master inventory may be to at least one of a component record associated with the component to include the updated component data or a related component record associated with the related component to include the updated related component data. The update to the master inventory may be performed when the master inventory excludes at least one of the updated component data in associated with the component or the updated related component data associated with the related component.

In another embodiment, a telecommunication network management system is disclosed. The telecommunication network management system is implemented in a telecommunications carrier network comprising a plurality of cell sites and a radio access network (RAN). The telecommunication network management system comprises one or more memories configured to store a master inventory including data regarding a plurality of components in each of the cell sites in the RAN, one or more processor coupled to the one or more memories, and an inventory application, stored on the one or more memories. The inventory application, when executed by the one or more processors, causes the inventory application to be configured to determine that a trigger event has occurred to obtain updated component data for one or more components in a cell site of the telecommunications carrier network, and receive updated component data associated with one or more components in a cell site. The updated component data comprises a most up-to-date version of data describing the one or more components, and the updated component data is received from at least one of an operational support system (OSS) in the telecommunications carrier network, or a state data store configured to maintain up-to-date data describing a plurality of components in the cell site. The inventory application is further configured to update, in the master inventory, records associated with each of the one or more components to include the updated component data when the master inventory excludes the updated component data associated with the one or more components.

In yet another embodiment, a method for on-demand cell site inventory update retrieval in a telecommunications carrier network comprising a plurality of cell sites and a radio access network (RAN) is disclosed. The method comprises determining, by an inventory application executing on a computer system in the telecommunications carrier network, that a trigger event has occurred to obtain updated component data for one or more components in a cell site of the telecommunications carrier network, and receiving, by the inventory application, updated component data associated with one or more components in a cell site, wherein the updated component data comprises a most up-to-date version of data describing the one or more components. The updated component data is received from at least one of an operational support system (OSS) in the telecommunications carrier network, or a state data store configured to maintain up-to-date data describing a plurality of components in the cell site. The method further comprises storing, in a memory, a master inventory including data regarding a plurality of components in each of the cell sites in the RAN, and updating, by the inventory application, in the master inventory, records associated with each of the one or more components to include the updated component data when the master inventory excludes the updated component data associated with the one or more components.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
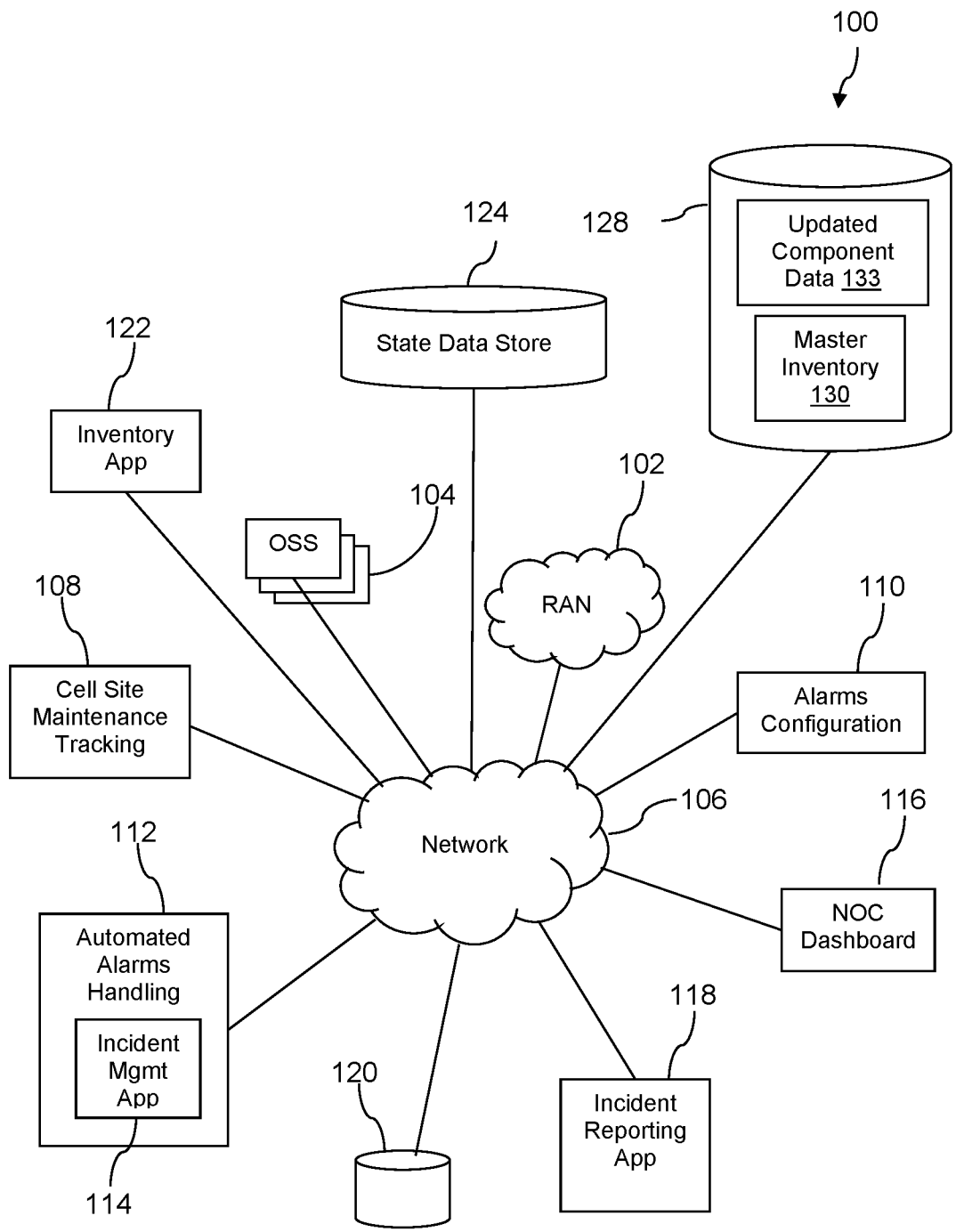
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A telecommunications carrier network may maintain and store a master inventory describing inventory information of every component in the radio access network (RAN) of the carrier network. The master inventory may specifically include inventory information of every component in all of the cell sites in the RAN. The components of the cell sites that are described in this master inventory may include any or all hardware equipment present at the cell sites and software platforms installed at the cell sites. The components may even include logical paths configured at the cell sites. For example, the components may include cellular equipment (e.g., antennas, radio head units, and fiber cables), power equipment (e.g., power systems and backup battery systems), structural equipment, safety equipment, wirings, memory storage, processing resources (e.g., central processing units), firmware installed at the equipment, software updates installed at the equipment, logical paths configured at the cell sites, and/or any other hardware equipment or software application implemented at the cell sites.

The inventory information in the master inventory may describe various features of each of the components at the cell site. For example, the inventory information may include identification data, configuration data, expected state data, operational data, structural data, physical coupling data regarding physical couplings in the cell site, logical coupling data regarding logical couplings in the cell site, cellular communications data, power data, data rates, range, directional characteristics, reflection/absorption of radio energy characteristics, geographical factors, regulatory factors, weather factors, maintenance states, timing limitations, and/or any other type of data that may be used to describe a component in the cell site or the cell site as a whole. For example, the identification data may include a serial number of the component. The configuration data may indicate a configuration of the component at installation or a last known configuration of the component (e.g., a type or version of firmware installed on a component). The expected state data may indicate a last known expectation of a state of operation of the component (e.g., whether the cell site is offline or online). The operational data may indicate a last known operational state of the component (e.g., whether the component is functioning above capacity, below capacity, or has failed). For example, the cellular communications data may include operational frequencies of the cell tower. The maintenance state may indicate a last known maintenance state of the component (e.g., in maintenance and offline or out of maintenance and online).

The inventory information may be pulled from a variety of different sources, such as, for example, from operational support systems (OSSs) implemented in the carrier network, various data stores in the carrier network and external to the carrier network, and even from the vendor supplying/maintaining the component in the carrier network. For example, creating and updating the master inventory with the inventory information may involve communication with various OSSs, reading large extensible markup language (XML) files, normalizing the inventory information to be encoded consistently throughout the database, etc.

In this way, the master inventory may maintain a much more robust inventory of the components across the cell sites than simply a generic knowledge of parts. That is to say, the master inventory may maintain a more sophisticated understanding of the cell site by keeping an inventory of not only the components in the cell tower, but also connections in and out of the cell site, configurations of the connections, network cards used to make the connections, configurations of the network cards and ports in the cell site, logical connections that flow through the network cards using various ports of the cell site, power systems used to provide the network attributes of the cell sites (e.g., data rate and reflection/absorption characteristics), etc.

The robust nature of the master inventory provides for a much more accurate method for diagnosing issues throughout the carrier network and identifying root causes for the issues. For example, the details in the master inventory may be used by the alarm and incident reporting system, as further described herein with reference to FIG. 1, to more accurately configure components to detect certain events and trigger alarms accordingly, and more strategically generate incident reports to resolve problems that may arise because of the events. For example, the most up-to-date details regarding the component may be needed to effectively install an alarm on the component when certain outage events (e.g., failures or failures to operate below a threshold capacity) are detected. For example, because different network cards from different vendor providers may use different firmware and thus operate slightly differently, an accurate inventory of firmware may be used to determine how to properly download an alarm on the network card. In addition, the current physical couplings and logical couplings to the network card may be relevant in determining whether to and how to process an incident report related to the network card.

However, the master inventory may not be updated frequently enough to realistically provide the most up-to-date information about a component. A proper update of a master inventory may take place over 24-48 hours before a current state of the cell sites are actually reflected in the master inventory. This may be because the system may take a considerable amount of time to pull together all the pieces of information for an update to the inventory information stored in a record in the inventory, given the detailed nature of the inventory information stored for each component. In other words, it may take 24-48 hours for all the inventory updates to be retrieved for all of the components in the RAN, and all of the records to be updated accordingly. By then, several components in the RAN may have been updated again in some form, which may not be reflected in the master inventory, resulting in the master inventory depicting an inaccurate snapshot of the state of the components in the cell site. For example, this may be problematic when a technician enters the location of the cell site to perform a maintenance action at the cell site or to troubleshoot an issue at the cell site. The technician may not have the most accurate information regarding the components of the cell site and thus, may not be able to accurately perform the maintenance action at the cell site or troubleshoot the issue at the cell site.

The present disclosure teaches a technical solution to the foregoing technical problem related to network operations and maintenance by maintaining an on-demand inventory of components and one or more related components in the cell site. The on-demand inventory of components may be created and maintained by obtaining a most up-to-date version of data describing the component and any related components from a variety of different sources, as further described herein. The most up-to-date version of data describing the component and any related components may be obtained periodically or in response to a request. This inventory may then be inserted into the master inventory in an efficient, piecemeal and/or parallel method, such that the master inventory may reflect a far more accurate and current state of the components in the cell site. In this way, the embodiments disclosed herein enable an inventory application to create an up-to-date and current master inventory, which may be used by the technician and/or operator in the carrier network to perform more accurate diagnostics and resolutions throughout the carrier network. Therefore, rather than updating a master inventory in the afore-mentioned large-scale update method that may take place over a 24-48 hour time, the embodiments disclosed herein keep the master inventory updated over time in a more efficient manner, as further described herein. The master inventory may be continuously updated as updated data is received from components and related components, such that at any given moment, the master inventory reflects a more accurate state of the components at the cell sites. In this way, the embodiments disclosed herein maintain a more accurate reflection of the network, thereby preventing future outages in the RAN, increasing networking capacity, conserving processing resources, and preserving networking resources throughout the carrier network.

In an embodiment, the carrier network may include an inventory application in communication with one or more OSSs, which may serve different NEs and cell sites in the RAN, as further described below with reference to FIG. 1. The inventory application may determine that a trigger event has occurred to obtain updated component data for one or more components in a cell site of the carrier network. The trigger event may occur when a request for an inventory update associated with the cell site and indicating at least one of the one or more components is received. The trigger event may also occur when an indication of a maintenance action being performed at a component in the cell site is received. The trigger event may also occur when an indication of a change in a state of a component in the cell site is received. The foregoing indications may be received by the inventory application in a message from an operator or technician of the cell site, or may be automatically sent to the inventory application by the component.

In an embodiment, the inventory application may receive updated component data associated with components in a cell site. The updated component data may include a most up-to-date version of data describing the component. The inventory application may receive the updated component data from a variety of different sources. For example, the inventory application may receive the updated component data from an OSS in the carrier network, in which the OSS may serve the component at the cell site. The OSS may receive the updated component data from the component itself, or the updated component data may be cached at the OSS after having been received either from the component itself or in a message from an operator or technician of the cell site. The OSS may then forward the updated component data to the inventory application. In another embodiment, the inventory application may receive the updated component data from a state data store in the carrier network. The state data store may maintain up-to-date data describing, for example, all of the components in the cell site. The up-to-date data may have been previously received and stored at the state data store, for example, in response to receiving the up-to-date data from the components themselves or in a message from an operator or technician of the cell site.

In an embodiment, the components in the cell site for which the updated component data is received may include at least one primary component and one or more related components. The at least one primary component may have been identified in the trigger event (i.e., indicated in the request, identified as having a maintenance action performed thereon, identified as having a state change, etc.). The one or more related components may be determined as related to the primary component based on various factors, such as, for example, whether the related components are communicatively coupled to the primary component, installed at the primary component, configured on a logical path with the primary component, located proximate to the primary component within the cell site, or otherwise affected in any way by the primary component. For example, the primary component may be a network card, and the one or more related components may be a version of the firmware installed at the network card, ports that operate with the network card, a radio head unit that operates with the network card, etc. The inventory application may identify these related components based on the primary component and the data stored at the master inventory, and then pull the updated component data for not only the primary component but also the related components.

In an embodiment, the inventory application may update the master inventory in a piecemeal and efficient fashion to ensure that only deltas between the master inventory and the updated component data are added/replaced/modified/deleted with respect to the master inventory. The inventory application may determine whether the master inventory excludes the updated component data associated with the primary components and/or related components. The inventory application may update the records associated with the primary components and/or related components only when the updated component data for those primary components and/or related components are not reflected in the master inventory.

In an embodiment, multiple updates may be performed in parallel to the master inventory to significantly increase the efficiency of updating the master inventory and to maintain a most up-to-date version of the master inventory for use by technicians and operators in the carrier network. For example, different records in the master inventory for different components across the same or different cell sites may be updated in parallel, simultaneously, to greatly increase the speed at which updates are provisioned into the master inventory. When multiple updates are to be performed on the same components at the same cell site, the inventory application may maintain a queue to ensure first in and first out processing of the updates to the components in the master inventory.

In this way, the embodiments disclosed herein provide a far more efficient and accurate method for maintaining a master inventory of the components across multiple cell sites in a RAN. By maintaining a more accurate and current master inventory, operators and technicians of the cell sites may be able to diagnose issues more accurately, configure components in cell site to generate alarms and incident reports more accurately, and prevent future outages in the carrier network. All of this in turn leads to increased network capacity and increased resource availability across the network over time.

Turning now to FIG. 1, a communication system 100 is described. In an embodiment, the communication system 100 comprises a radio access network (RAN) 102, a plurality of operational support systems (OSSs) 104, a network 106, a cell site maintenance tracking system 108, an alarms configuration system 110, an automated alarms handling system 112 that executes an incident management application 114, a network operation center (NOC) dashboard system 116, an incident reporting system (or application) 118, and a data store 120. In an embodiment, communication system 100 further comprises an inventory application 122, a state data store 124, and an inventory data store 128, each coupled to network 106. In an embodiment, the communication system 100 may be a telecommunications carrier networking comprising the RAN 102.

The RAN 102 comprises a plurality of cell sites and backhaul equipment. In an embodiment, the RAN 102 comprises tens of thousands or even hundreds of thousands of cell sites. The cell sites may comprise electronic equipment and radio equipment including antennas. The cell sites may be associated with towers or buildings on which the antennas may be mounted. The cell sites may comprise a cell site router that couples to a backhaul link from the cell sites to the network 106. The cell sites may provide wireless links to user equipment (e.g., mobile phones, smart phones, personal digital assistants, laptop computers, tablet computers, notebook computers, wearable computers, headset computers) according to a 5G, a long-term evolution (LTE), code division multiple access (CDMA), or a global system for mobile communications (GSM) telecommunication protocol. In an embodiment, the OSSs 104 comprise tens or even hundreds of OSSs. The network 106 comprises one or more public networks, one or more private networks, or a combination thereof. The RAN 102 may from some points of view be considered to be part of the network 106 but is illustrated separately in FIG. 1 to promote improved description of the system 100.

The cell site maintenance tracking system 108 is a system implemented by one or more computers. Computers are discussed further hereinafter. The cell site maintenance tracking system 108 is used to track maintenance activities on network elements (e.g., cell site equipment, routers, gateways, and other network equipment). When a network element (NE) is in maintenance, alarms that may occur on the NE may be suppressed, to avoid unnecessarily opening incident reports related to such alarms that may be generated because of unusual conditions the equipment may undergo pursuant to the maintenance activity. When a maintenance action is completed, maintenance personnel may be expected to check and clear all alarms pending on the subject NE before the end of the time scheduled for the maintenance activity.

The alarm configuration system 110 is a system implemented by one or more computers. The alarm configuration system 110 allows users to define rules and instructions for handling alarms, for example rules for automatic processing of alarms by the automated alarms handling system 112. The alarm configuration system 110 may define rules for when an alarm leads to automatic generation of an incident report, as described herein.

Alarms are flowed up from NEs of the RAN 102 via the OSSs 104 to be stored in the data store 120. The NOC dashboard 116 can access the alarms stored in the data store 120 and provide a list of alarms on a display screen used by NOC personnel. NOC personnel can manually open incident reports on these alarms. In an embodiment, the NOC dashboard 116 provides a system that NOC personnel can use to monitor health of a carrier network (e.g., monitor the RAN 102 and at least portions of the network 106), to monitor alarms, to drill down to get more details on alarms and on NE status, to review incident reports, and to take corrective actions to restore NEs to normal operational status. The NOC dashboard 116 may interact with the data store 120, with the cell site maintenance tracking system 108, the OSSs 104, the RAN 102, and other systems. NOC personnel can use the NOC dashboard 116 to manually create incident reports based on alarms reviewed in a user interface of the NOC dashboard 116.

The incident reporting application (or system) 118 can monitor the alarms stored in the data store 120 and automatically generate incident reports on these alarms based in part on the alarm configurations created and maintained by the alarms configuration system 110. For example, an alarm configuration rule defined by the alarm configuration system 110 may indicate that an incident report is not to be opened related to a specific alarm until the alarm has been active for a predefined period of time, for example for five minutes, for ten minutes, for fifteen minutes, for twenty minutes, for twenty-five minutes, or some other period of time less than two hours. The time criteria for auto generation of incident reports may be useful to avoid opening and tracking incidents that are automatically resolved by other components of the system 100, as described further hereinafter. Incident reports may be referred to in some contexts or by other communication service providers as tickets or trouble tickets.

The incident management application 114 may operate upon incident reports in a sequence of processes. In an embodiment, the incident management application 114 may perform automated triage on incident reports that includes automated enrichment of alarms and/or incident reports, automated dispatch to field operations personnel for some incident reports, and automated testing. Automated enrichment may comprise looking-up relevant information from a plurality of disparate sources and attaching this relevant information to the incident report. The looked-up information may comprise local environmental information such as weather reports, rainfall amounts, temperature, wind. The looked-up information may comprise logs of recent maintenance activities at the affected NE.

The automated triage process may involve determining a probable root cause for the incident and adding this to the incident report during the enrichment action. The probable root causes may be categorized as related to electric power, backhaul (e.g., transport), maintenance, or equipment (e.g., RAN hardware related), but within these general categories it is understood there may be a plurality of more precise probable root causes. The automated triage process can assign an incident report to personnel for handling based on its determination of the probable root cause of the incident report.

In an embodiment, the incident management application 114 may automatically close an incident report when NE status warrants such automated closure. Automated closure may happen because NOC personnel have taken manual corrective action to restore proper function of one or more NEs. Automated closure may happen because the incident management application 114 determines that the incident report was created pursuant to a maintenance action that extended beyond the scheduled maintenance interval and that the scheduled maintenance interval was later extended, but extended after a related incident report had already been generated. The incident management application 114 may perform automated remediation of alarm conditions associated with incident reports. For example, cell sites can be reset to restore operation and clear alarmed conditions. For example, cell sites can be locked and unlocked to restore operation and clear alarmed conditions. For example, cell sites may be resynched with GPS. For example, a software or firmware update may be pushed to cell sites.

For the foregoing alarm and incident reporting system and method to operate accurately, an accurate and up-to-date inventory of the components, both hardware and software, in the RAN 102 may need to be maintained by the communication system 100. Thus, as mentioned above, the communication system 100 may further include the inventory application 122, the state data store 124, and the inventory data store 128. While the inventory application 122 is shown as a separate entity in the communication system 100, the inventory application 122 may, in other embodiments, be part of the incident management application 114, the incident reporting application 118, or a component or platform separate from each of the incident management application 114 and the incident reporting application 118. In an embodiment, the inventory application 122 may be part of the NOC dashboard 116. In an embodiment, the state data store 124 and/or the inventory data store 128 may be part of the cell site maintenance tracking system 108.

The inventory application 122 may also be communicatively coupled to one or more OSSs 104, each of which may serve different NEs and cell sites in the RAN 102. The inventory application 122 may determine that a trigger event has occurred to obtain updated component data for one or more components in a cell site of the RAN 102. In an embodiment, the inventory application 122 may receive updated component data 133 associated with components in a cell site. The updated component data 133 may include a most up-to-date version of data describing the component.

The inventory application 122 may receive the updated component data 133 from a variety of different sources. For example, the inventory application 122 may receive the updated component data 133 from an OSS 104 in the RAN 102 serving the component at the cell site. The OSS 104 may receive the updated component data 133 from the component itself or from the cell site in which the component is located. The OSS 104 may receive the updated component data 133 from a cache in the OSS 104. For example, the OSS 104 may have previously received the updated component data 133 either from the component itself, from the cell site in which the component is located, or in a message from an operator or technician of the cell site. The OSS 104 may then forward the updated component data 133 to the inventory application 122.

In another embodiment, the inventory application 122 may receive the updated component data from the state data store 124. The state data store 124 may maintain up-to-date data describing, for example, all of the components in the cell site. The up-to-date data may have been previously received and stored at the state data store 124, for example, in response to receiving the up-to-date data from the components themselves, from the cell sites in which the components are located, or in a message from an operator or technician of the cell site.

In an embodiment, the inventory application 122 may update a master inventory 130 maintained in the inventory data store 128 to include the updated component data 133. The master inventory 130 may include inventory information of one or more components in one or more of the cell sites in the RAN 102. The inventory application 122 may determine whether a record associated with the component(s) described by the updated component data 133 in the master inventory 130 excludes the updated component data 133. The inventory application 122 may update the records associated with the component(s) only when the updated component data 133 for those component(s) are not reflected in the master inventory 130. For example, the inventory application 122 may only update values in the record including the type of data that is indicated in the updated component data 133, when the values in the record do not reflect the updated component data 133.

Figure 2A:
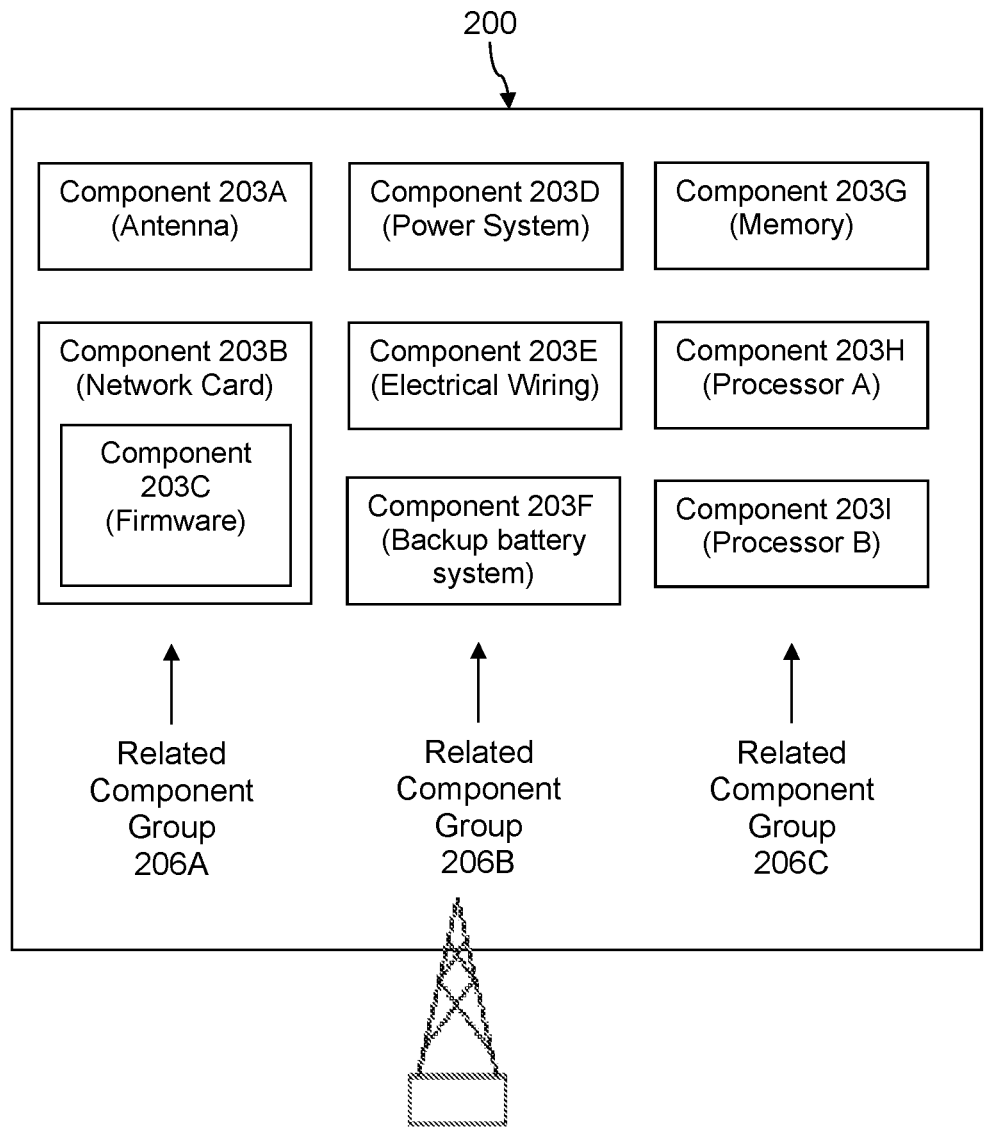
FIG. 2A-2C illustrate various aspects of an inventory maintenance system included in the system of FIG. 1 according to an embodiment of the disclosure.

Turning now to FIG. 2A, a diagram illustrating the components 203A-I (also sometimes referred to herein as simply "component 203") in a cell site 200 of the RAN 102 is shown. The components 203 may refer to various hardware equipment and/or software platforms implemented at the cell site 200. The components 203 may also refer to data artifacts such as, for example, data files or configuration files. The components 203A-I may even include logical paths configured at the cell sites. For example, the components 203A-I may include cellular equipment (e.g., antennas, radio head units, and fiber cables), power equipment (e.g., power systems and backup battery systems), structural equipment, safety equipment, wirings, memory storage, processing resources (e.g., central processing units), firmware installed at the equipment, software updates installed at the equipment, logical paths configured at the cell sites, and/or any other hardware equipment or software application implemented at the cell sites.

As shown in FIG. 2A, components 203A-I correspond to various example components in a cell site 200. Component 203A may refer to one or more antennas in the cell site 200, component 203B may refer to a network card at the cell site 200, and component 203C may refer to firmware installed at the network card. In this way, components 203A-C are part of a related component group 206A because each of components 203A-C are pieces of cellular equipment at the cell site 200, and a status of each equipment 203A-C may be related to and/or affected by one another. Said another way, components 203A-C are part of a related component group 206A because components 203A-C are at least one of communicatively coupled to one another, installed at one component 203A-C, configured on a logical path with another component 203A-C, located proximate to one another, or otherwise affected by one another.

In the same way, components 203D-F are in a related component group 206B, and components 203G-I are in a related component group 206C. Component 203D may refer to a power system of the cell site 200, component 203E may refer to the electrical wiring at the cell site 200, component 203F may refer to a backup battery system at the cell site 200. In this way, components 203D-F are in a related component group 206B in that each of components 203D-F are related to the power at the cell site 200, and a status of each equipment 203D-F may be related to and/or affected by one another. Component 203G may refer to a memory at the cell site 200, component 203H may refer to a first processor A (e.g., CPU) at the cell site 200, and component 203I may refer to a second processor B (e.g., microprocessor) at the cell site 200. In this way, components 203G-I are in a related component group 206C in that each of components 203G-I are related to the processing/memory at the cell site 200, and a status of each equipment 203G-I may be related to and/or affected by one another.

Figure 2B:
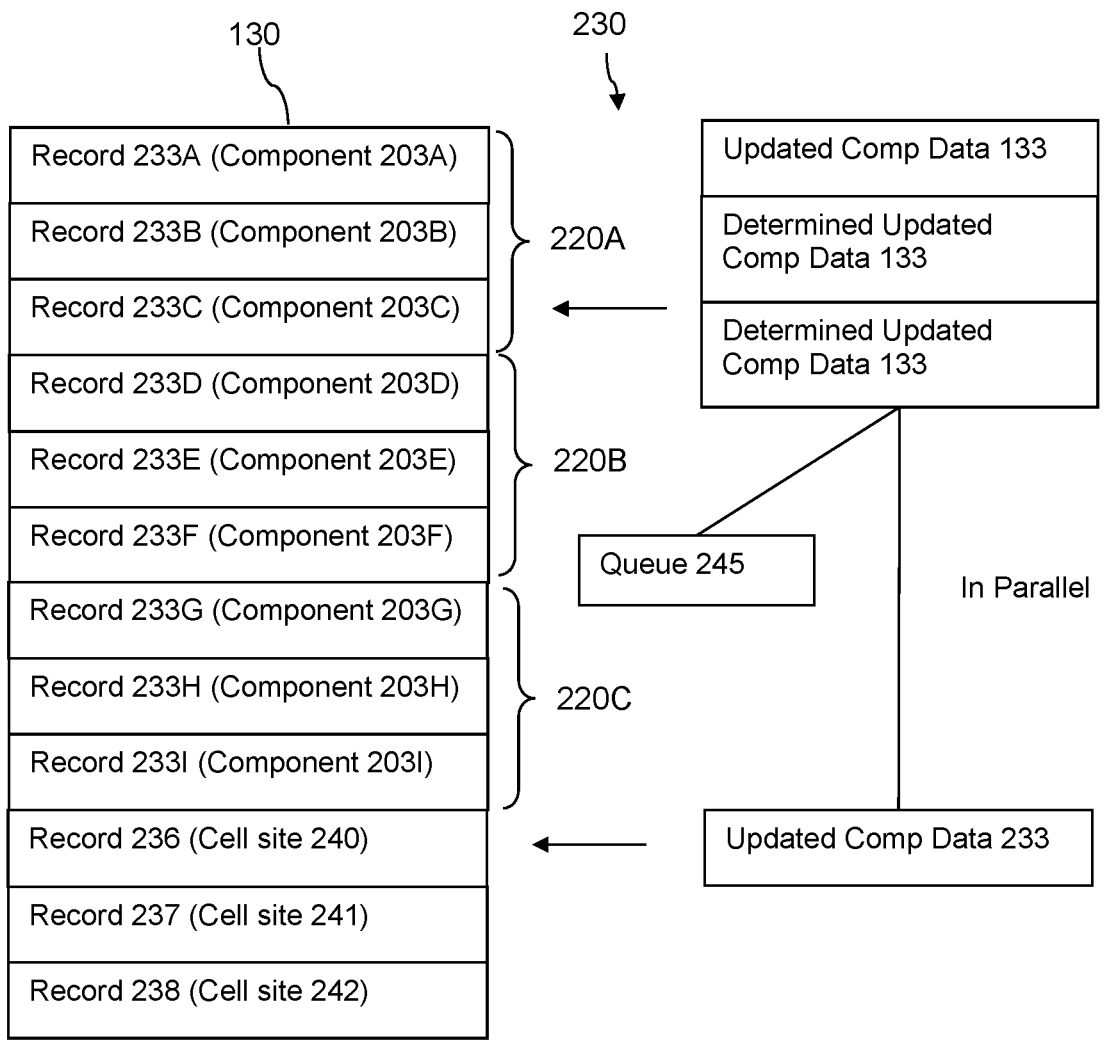

Turning now to FIG. 2B, a process 230 of adding updated component data 133 to records 233A-I and 236-238 in a master inventory 130 is shown. As shown in FIG. 2B, the master inventory 130 may include records 230A-I for each of the components 203A-I described in FIG. 2A. As mentioned above, records 230A-I relate to components 203A-I in a single cell site 200. However, the master inventory 130 may include records 236-238 that each correspond to different cell sites 240-242. That is, record 236 may describe features of a component 203 in second cell site 240, record 237 may describe features of a component 203 in a third cell site 241, and record 238 may describe features of a component 203 in a fourth cell site 242. In this way, the master inventory 130 may include records 233A-I and 236-238 describing components 203 in at least one cell site 200 or multiple cell sites 200 and 240-242 across the RAN 102.

Each record 233A-I and 236-238 may include values representing different types of inventory information, which may describe various features of the component 203. For example, the values in each of the records 233A-I and 236-238 may indicate one or more of the following types of inventory information: identification data, configuration data, expected state data, operational data, structural data, physical coupling data regarding physical couplings in the cell site, logical coupling data regarding logical couplings in the cell site, cellular communications data, power data, data rates, range, directional characteristics, reflection/absorption of radio energy characteristics, geographical factors, regulatory factors, weather factors, maintenance states, timing limitations, and/or any other type of data that may be used to describe a component in the cell site or the cell site as a whole. In an embodiment, the values in the records 233A-I and 236-238 may be normalized and all encoded according to a standardized format to improve data integrity and permit the data to be queried and manipulated in a universal, standardized manner.

Continuing with the example shown in FIG. 2A, cell site 200 includes three related component groups 206A-C. The related component group 206A includes components 203A-C, related component group 206B includes components 204D-F, and related component group 206C includes components 204G-I. The master inventory 130 may maintain logical groupings 220A-C of records 233A-I that include data of related component groups 206A-C. As shown in FIG. 2B, the master inventory 130 may maintain a grouping 220A of records 233A-C as being related since the components 203A-C described by the records 233A-C are indicated as being part of related component group 206A. For example, each of the records 233A-C may include a flag or value indicating that the respective component 203A-C is related to the other components 203A-C in the related component group 206A. Similarly, the master inventory 130 may maintain a grouping 220B of records 233D-F for components 203D-F in related component group 260B and a grouping 220C of records 233G-I for components 203G-I in related component group 260C.

The updated component data 133 may include values that represent one or more of the foregoing types of inventory information. When the inventory application 122 obtains the updated component data 133, the inventory application 122 may normalize the updated component data 133 into the standard format of the master inventory 130 prior to inserting the updated component data 133 into the master inventory 130.

In an embodiment, the components 203 in the cell site 200 and 240-242 for which the updated component data 133 is received may include at least one primary component 203A-I and one or more related components 203A-I. In an embodiment, the inventory application 122 may update the master inventory 130 for multiple related component groups 206A-C when the updated component data 133 includes updated data for all related component groups 206A-C or even when the updated component data 133 only includes updated data for a single primary component 203A-I.

As an illustrative example, a primary component 203B for which the updated component data 133 is received may be component 203B, which is the network card of cell site 200. The update may have been performed on the network card by a field technician, and the field technician may have requested an update to the master inventory 130 according to the update performed on the network card. In one case, the field technician may update one or more of the components 203A (antenna) and 203C (firmware) at the cell site when updating the component 203B (i.e., the network card), document the updates performed to component 203B and component 203A and/or 203C, and send the updates as updated component data 133 to the inventory application 122. In this case, the updated component data 133 includes updated data regarding component 203B and component 203A and/or 203C.

The inventory application 122 may insert the updated component data 133 for component 203B into the record 233B when the record 233B excludes the updated component data 133. For example, the field technician may have replaced the network card with a new network card, such that the component 203B refers to a new network card. In this case, the updated component data 133 for component 203B may obtain a serial number and/or other features of the new network card. The inventory application 122 may determine that the record 233 excludes (does not include) the updated component data 133 reflecting the new network card placed at component 203B. The inventory application 122 may delete record 233B and add a new record 233B with values representing the new network card (e.g., replace the values in record 233B), or the inventory application 122 may modify the existing values in the record 233B with the current values describing the newly replaced network card in the record 233B.

In this example, the updated component data 133 may also include the updated values for the features of components 203A and/or 203C in the related component group 206A. The inventory application 122 may similarly obtain records 233A and/or 233C to determine whether the updated component data 133 for components 203A and/or 203C is reflected in the records 233A and/or 233C, and insert/replace/modify the values into the records 233A and/or 233C only when the records 233A and/or 233C exclude the updated component data 133 for components 203A and/or 203C.

However, in another case, the field technician may only update the component 203B (i.e., the network card), document the update performed to component 203B, and send the update as updated component data 133 to the inventory application 122. In other words, the updated component data 133 may only include updated data regarding component 203B. In an embodiment, the inventory application 122 may determine one or more of the related component group 206A to the primary component 203B based on the record 233B corresponding to the primary component 203B. For example, the record 233B may indicate the grouping 220A by, for example, including a pointer to or an address of other records 233A and 233C in the same grouping 220A indicating that these components 203A-C are in a related component group 206A. In this way, the inventory application 122 may determine other components 203A and/or 203B that may need to be updated based on the updated component data 133 being received for component 203B.

When the updated component data 133 indicates that the network card has been replaced at component 203B, but does not reflect a new firmware being installed at component 203C, the inventory application 122 may determine that a potential failure may occur at the network card at component 203B (i.e., incompatible firmware failure). The inventory application 122 may transmit a message indicating the potential failure to a device of the field technician, within a predetermined period of time, ideally before the field technician leaves the cell site 200, to remind the field technician to potentially update the firmware at component 203C prior to leaving the cell site 200. In this way, the inventory application 122 may use the updated component data 133 and the identification of the related component 203C to potentially avoid failures or faults at the cell site 200 upon detection of on update that may affect the other components 203A-C in the related component group 206A.

The inventory application 122 may also request more updated component data 133 from the OSS 104 or state data store 124 when the updated component data 133 received from the field technician does not reflect any updates performed on the related components 203A and/or 203B. In either case, the inventory application 122 may insert, replace, and/or modify values in the records 233A-C after receiving the updated component data 133 and receiving any determined updated component data 133, possibly from the OSS 104 and/or state data store 124.

In an embodiment, multiple updates to the master inventory 130 may be performed in parallel to efficiently and effectively maintain a most up-to-date version of the master inventory 130 for use by technicians and operators in the carrier network. For example, records 200A-I for certain components 203 may be updated as described above in parallel with records 236-238 for other components 203, at the same cell site 200 or at a different cell site 240-242, as shown in FIG. 2B. When multiple updates are to be performed on the same components at the same cell site 200, the inventory application 122 may maintain a queue 245 to ensure first-in first-out processing of the updates to the components 203 in the master inventory 130. For example, the queue 245 may include multiple instances of the updated component data 133 to a single component 203B, and may be structured to maintain different queues 245 for different components 203A-I.

In an embodiment, the master inventory 130 may be maintained as a table with multiple records 233A-1, 236-238. However, it should be appreciated that the master inventory 130 may be implemented as any other type of data structure that may maintain records 233A-I, 236-238, each including values describing components across different cell sites 200, 240-242 and other possible NE in the RAN 102.

Figure 2C:
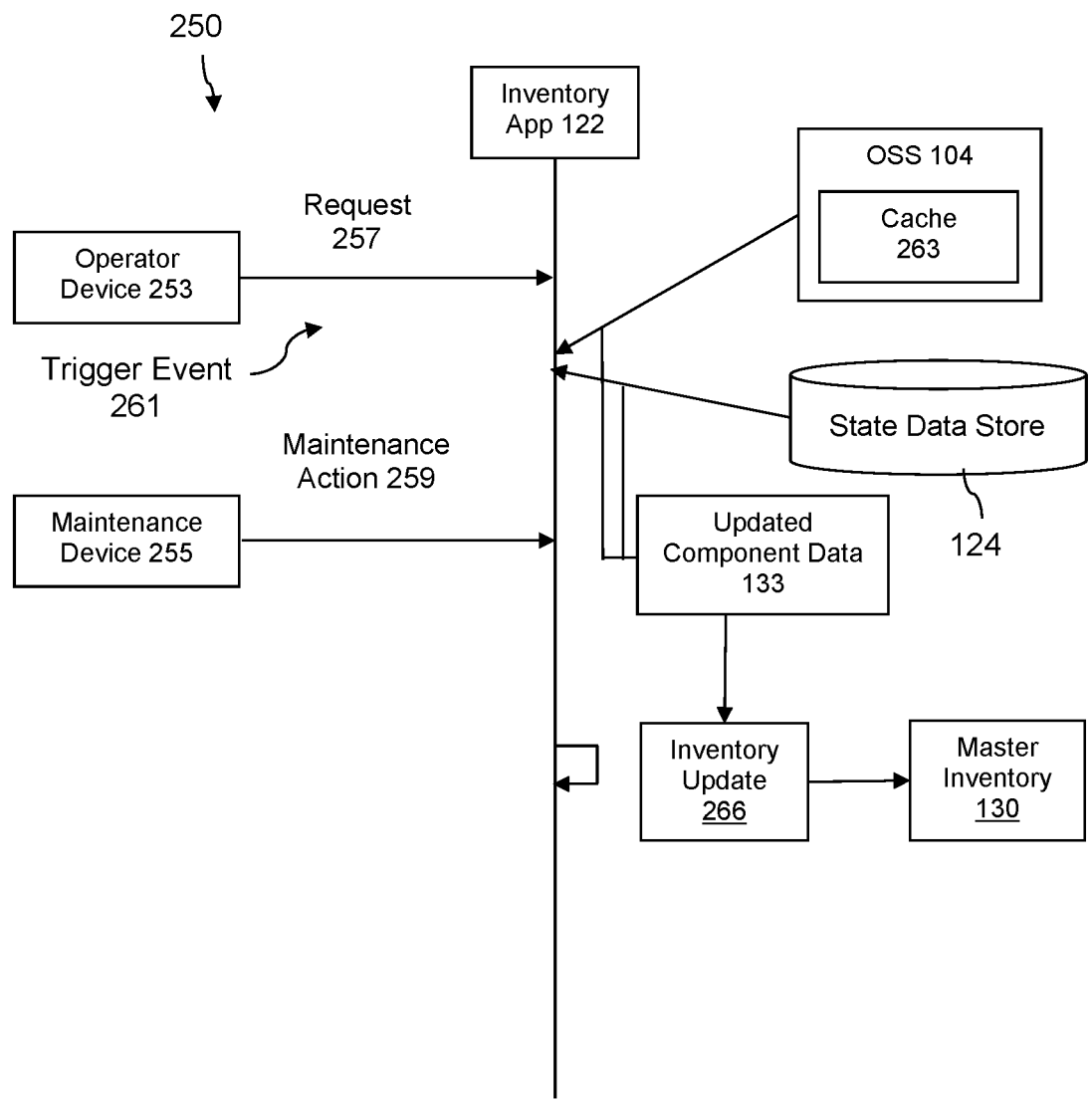

Turning now to FIG. 2C, shown is a sequence diagram of a method 250 implemented by the inventory management system implemented by the communication system 100 disclosed herein. As shown in FIG. 2C, method 250 may begin in response to the inventory application 122 detecting or receiving an indication of a trigger event 261. The trigger event 261 may occur when the inventory application 122 receives, from an operator device 253, a request 257 for an inventory update associated with the cell site 200, 240-242 and indicating at least one of the one or more components 203. The request 257 may include an identification of a primary component 203 and one or more related components 203. The request 257 may also include an identification of the cell site 200, 240-242 in which the components 203 are located. The operator device 253 may be, for example, a device at the NOC. The trigger event 261 may also occur when the inventory application 122 receives, from a maintenance device 255, an indication of a maintenance action 259 being performed at one or more components 203 in the cell site 200, 240-242. The maintenance device 255 may be a device of a field engineer, technician, or maintenance personnel that performs maintenance and/or repair tasks on the components 203 in the cell site. The maintenance device 255 may be capable of receiving input from the field engineer and sending messages to the NOC regarding maintenance actions 259 performed on the components 203 and regarding status updates of the components 203 (i.e., whether the components 203 are offline in maintenance state, online and properly functioning, online and functioning under performance thresholds, such as bandwidth, throughput, latency requirements, etc.). The trigger event 261 may also occur when an indication of a change in a state of a component 203 in the cell site 200, 240-242 is received. The foregoing indications may be received by the inventory application 122 in a message from an operator or technician of the cell site, or may be automatically sent to the inventory application 122 by a respective component 203.

In response to the trigger event 261, the inventory application 122 may obtain updated component data 133 from the OSS 104, the state data store 124, and/or other external sources, such as, for example, vendor systems related to the component 203, core networks, third party systems, etc. The OSS 104 may receive the updated component data 133 from the components 203, the cell site 200, 240-242 in which the component is located, a local cache 263 storing the updated component data 133, and/or any of the aforementioned external sources.

When the updated component data 133 is received from an OSS 104, the inventory application 122 may transmit one or more commands to the OSS 104 to retrieve the updated component data 133 for the primary component 203 and/or one or more related components 203. In response to the command, the OSS 104 may transmit a query to a component 203 in the cell site 200, 240-242 for the updated component data 133. The OSS 104 may then receive the updated component data 133 from the component 203, and transmit the updated component data 133 to the inventory application 122. In another embodiment, in response to the command, the OSS 104 may extract the updated component data 133 from a cache 263 communicatively coupled to the OSS 104 or located with the OSS 104. The OSS 104 may then transmit the updated component data 133 back to the inventory application 122. In some cases, the updated component data 133 may be received from different OSSs 104, in which each of the different OSSs 104 is associated with one or more of the primary components 203 and/or related components 203 in a related component group 206A-C.

The inventory application 122 may then repackage the updated component data 133 (e.g., normalize the updated component data 133) to obtain an inventory update 266 including the updated component data 133 in a normalized format. The inventory application 122 may then insert/add/replace/modify records (e.g., 233A-I, 236-238) in the master inventory 130 to include the updated component data 133 when the master inventory 130 does not include the updated component data 133.

Figure 3:
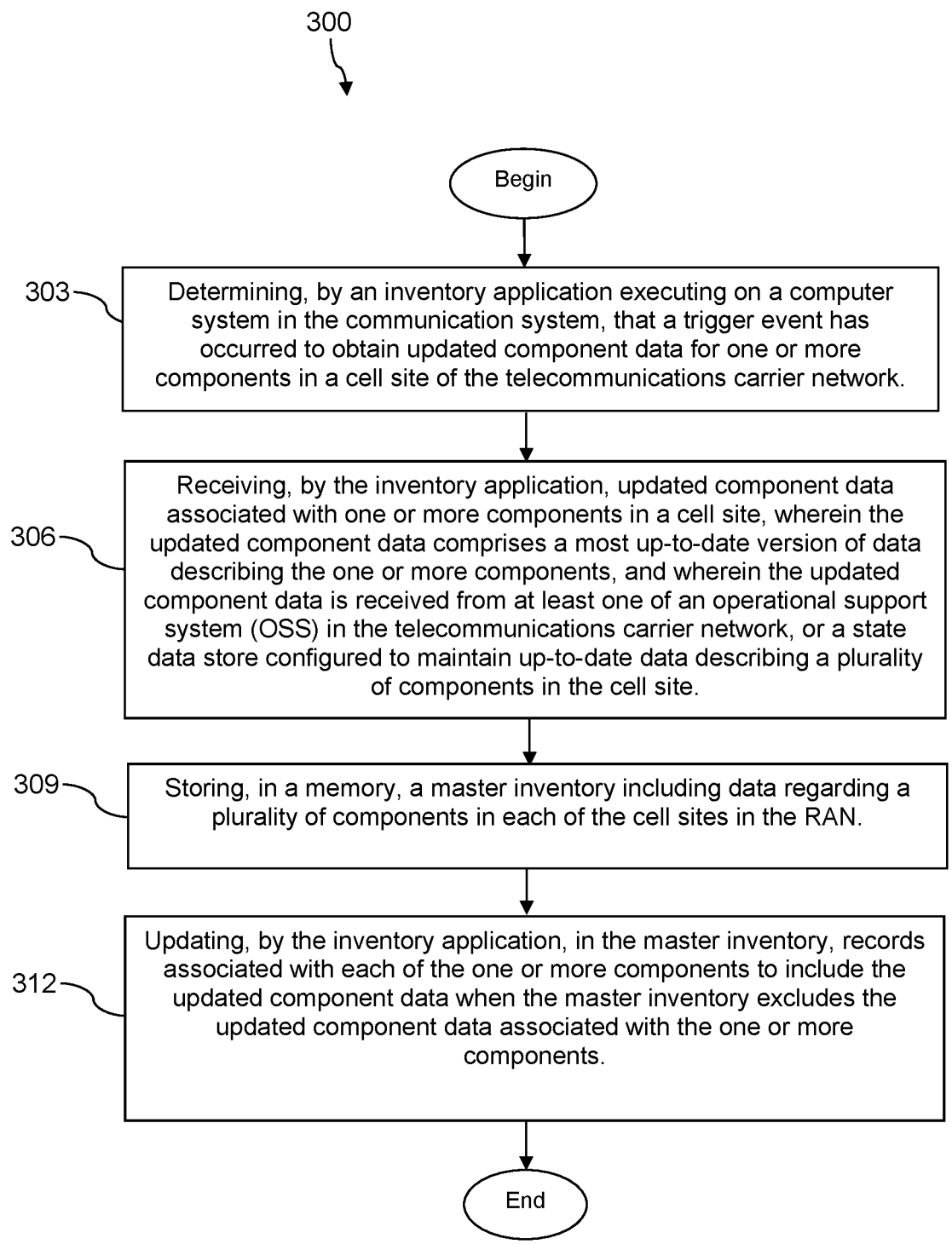
FIG. 3 is a flow chart of a first method according to an embodiment of the disclosure.

Turning now to FIG. 3, a method 300 is described. In an embodiment, method 300 may be a method for on-demand cell site inventory update retrieval in a telecommunications carrier network (e.g., in the communications system 100) comprising a plurality of cell sites and a radio access network (RAN). Method 300 may be performed by the inventory application 122 of the communication system 100.

At step 303, method 300 comprises determining, by an inventory application 122 executing on a computer system in the communication system 100, that a trigger event 261 has occurred to obtain updated component data 133 for one or more components 203 in a cell site 200, 240-242 of the telecommunications carrier network. In an embodiment, the trigger event 261 comprises at least one of receiving, by the inventory application 122, a request 257 for an inventory update associated with the cell site 200, 240-242 and indicating at least one of the one or more components 203, or receiving, by the inventory application 122, an indication of a maintenance action 259 being performed at the least one of the one or more components 203 in the cell site 200, 240-242.

At step 306, method 300 comprises receiving, by the inventory application, updated component data 133 associated with one or more components 203 in a cell site 200, 240-242. In an embodiment, the updated component data comprises a most up-to-date version of data describing the one or more components 203. In an embodiment, the updated component data 133 is received from at least one of the OSS 104 in the telecommunications carrier network or the state data store 124. The state data store 124 may be configured to maintain up-to-date data describing a plurality of components in the cell site. In an embodiment, the state data store 124 may maintain a configured state, an expected state, and an operational state for each of the components in the cell site 200, 240-242. In an embodiment, the one or more components 203 comprise a primary component 203 and one or more related components 203, and each of the related components 203 is at least one of communicatively coupled to the primary component 203, installed at the primary component 203, configured on a logical path with the primary component 203, located proximate to the primary component 203 within the cell site 200, 240-242, or affected by the primary component 203. In an embodiment, the updated component data 133 describing the one or more related components 203 are received from different OSSs 104 in the telecommunications carrier network, in which each of the different OSSs 104 is associated with a related component 203.

In an embodiment, when the updated component data 133 is received from the OSS 104, method 300 further comprises transmitting, by the inventory application 122 a command to the OSS 104 to retrieve the updated component data 133 for a component 203 of the one or more components 203. In response to the command, method 300 comprises transmitting, by the OSS 104, a query to a component 203 of the one or more components 203 in the cell site 200, 240-242 for the updated component data 133, receiving, by the OSS 104, the updated component data 133 from the component 203, and transmitting, by the OSS 104, the updated component data 133 to the inventory application 122.

In an embodiment, when the updated component data 133 is received from the state data store 124, method 300 further comprises transmitting, by the inventory application 122 a command to the state data store 124 to retrieve the updated component data 133 for a component 203 of the one or more components 203. In response to the commands, method 300 comprises extracting, by the OSS 104, the updated component data 133 from a cache 263 communicatively coupled to the OSS 104, and transmitting, by the OSS 104, the updated component data 133 to the inventory application 122.

At step 309, method 300 comprises storing, in a memory, a master inventory 130 including data regarding a plurality of components 203 in each of the cell sites 200, 240-242 in the RAN 102. At step 312, method 300 comprises updating, by the inventory application 122, in the master inventory 130, records 233, 236-238 associated with each of the one or more components 203 to include the updated component data 133 when the master inventory 130 excludes the updated component data 133 associated with the one or more components 203.

Figure 4:
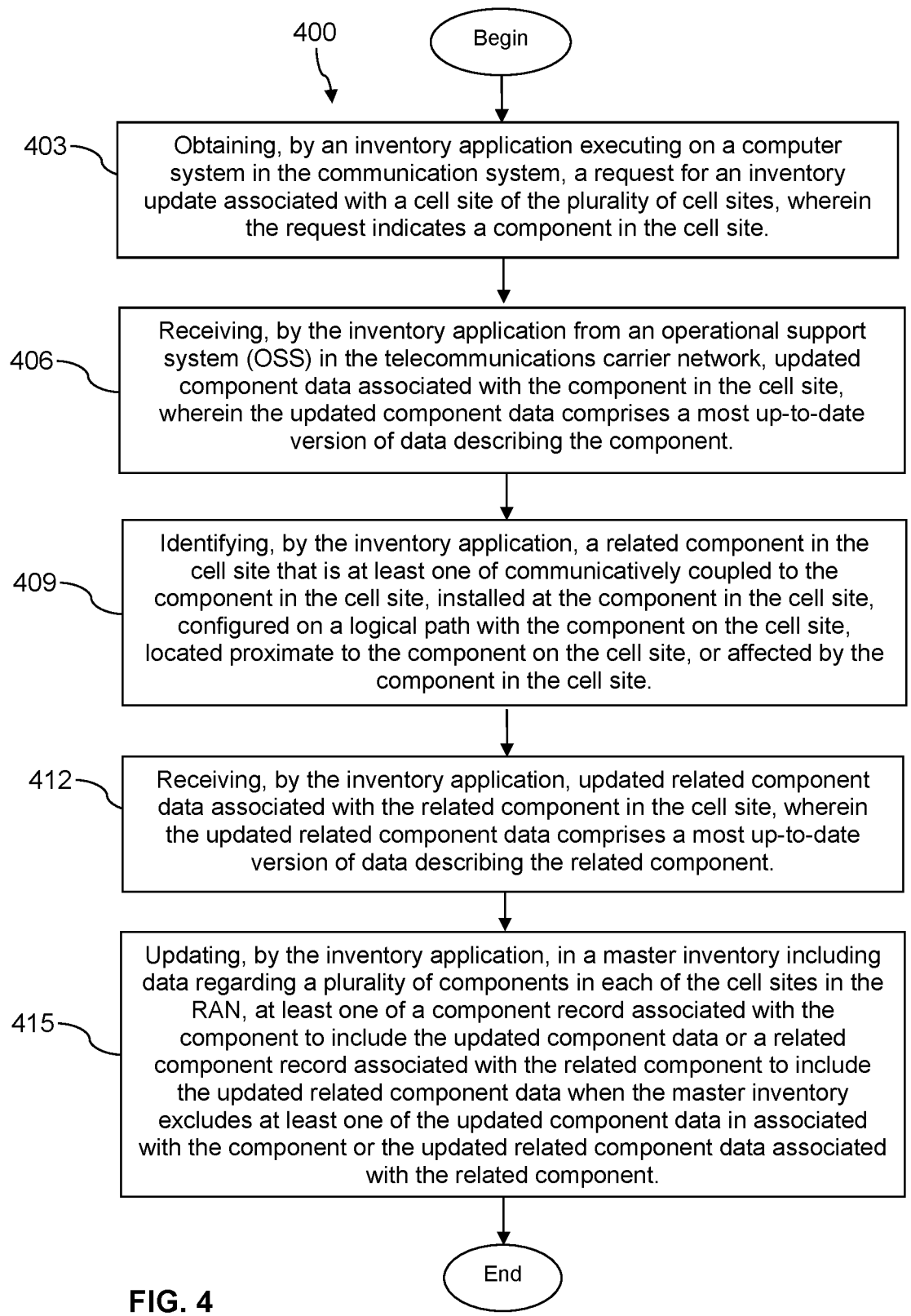
FIG. 4 is a flow chart of a second method according to an embodiment of the disclosure.

Turning now to FIG. 4, a method 400 is described. In an embodiment, method 400 may be a method for on-demand cell site inventory update retrieval in a telecommunications carrier network (e.g., in the communications system 100) comprising a plurality of cell sites and a radio access network (RAN). Method 400 may be performed by the inventory application 122 of the communication system 100.

At step 403, method 400 comprises obtaining, by an inventory application 122 executing on a computer system in the communication system, a request 257 for an inventory update associated with a cell site 200, 240-242 of the plurality of cell sites 200, 240-242. In an embodiment, the request 257 indicates a component 203 in the cell site 200, 240-242. In an embodiment, the request 257 for the inventory updated is received from a field engineer at the cell site 200, 240-242 or an operator at a network operations center (NOC) associated with the telecommunications carrier network.

At step 406, method 400 comprises receiving, by the inventory application 122 from an operational support system (OSS) in the telecommunications carrier network, updated component data 133 associated with the component 203 in the cell site 200-242. In an embodiment, the updated component data 133 comprises a most up-to-date version of data describing the component 203.

At step 409, method 400 comprises identifying, by the inventory application 122, a related component 203 in the cell site 240-242 that is at least one of communicatively coupled to the component in the cell site, installed at the component in the cell site, configured on a logical path with the component on the cell site, located proximate to the component on the cell site, or affected by the component in the cell site. In an embodiment, the component 203 is a network card at the cell site 200, 240-242, and wherein the related component 203 is a firmware of the network card.

At step 412, method 400 comprises receiving, by the inventory application 122, updated related component data 133 associated with the related component 203 in the cell site 200, 240-242. In an embodiment, the updated related component data 133 comprises a most up-to-date version of data describing the related component. In an embodiment, the updated component data 133 and/or the updated related component data 133 is cached at the OSS 104. In an embodiment, method 300 further comprises retrieving, by the OSS 104, the updated component data 133 from the component 203.

At step 415, method 400 comprises updating, by the inventory application 122, in a master inventory 130 including data regarding a plurality of components 203 in each of the cell sites 200, 240-242 in the RAN 102, at least one of a component record 233A-I associated with the component 203 to include the updated component data 133 or a related component record 233A-I associated with the related component 203 to include the related component data 133 when the master inventory 130 excludes at least one of the updated component data 133 in associated with the component 203 or the updated related component data 133 associated with the related component 203. In an embodiment, method 300 further comprises updating, by the inventory application 122, in the master inventory 130, a second set of records 236-238 associated with different components 203 in a different cell site 240-242 in parallel while updating, in the master inventory 130, the at least one of the component record 233A-I or the related component record 2363-1.

Figure 5A:
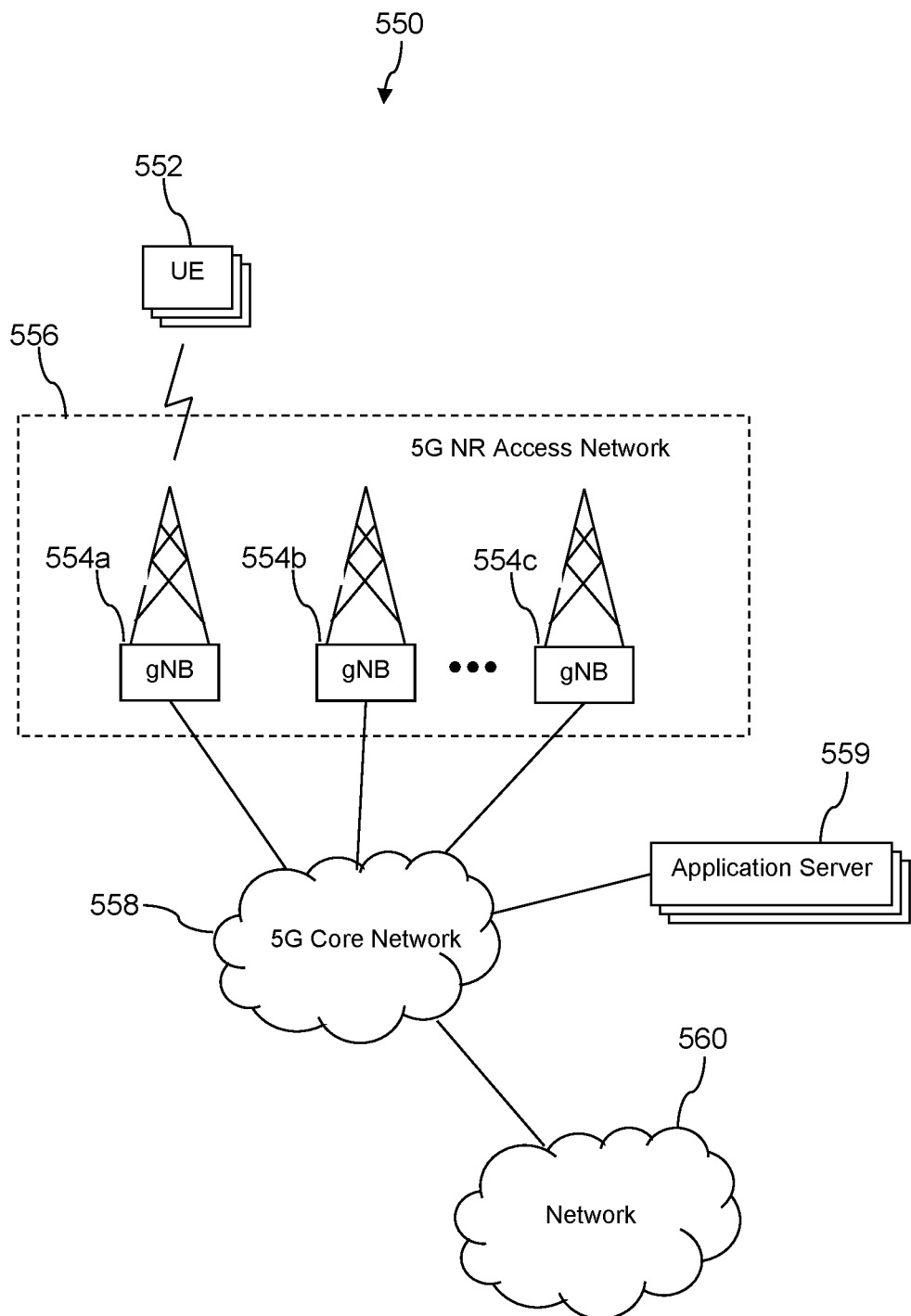
FIG. 5A and FIG. 5B are block diagrams of a 5G network according to an embodiment of the disclosure.
Figure 5B:
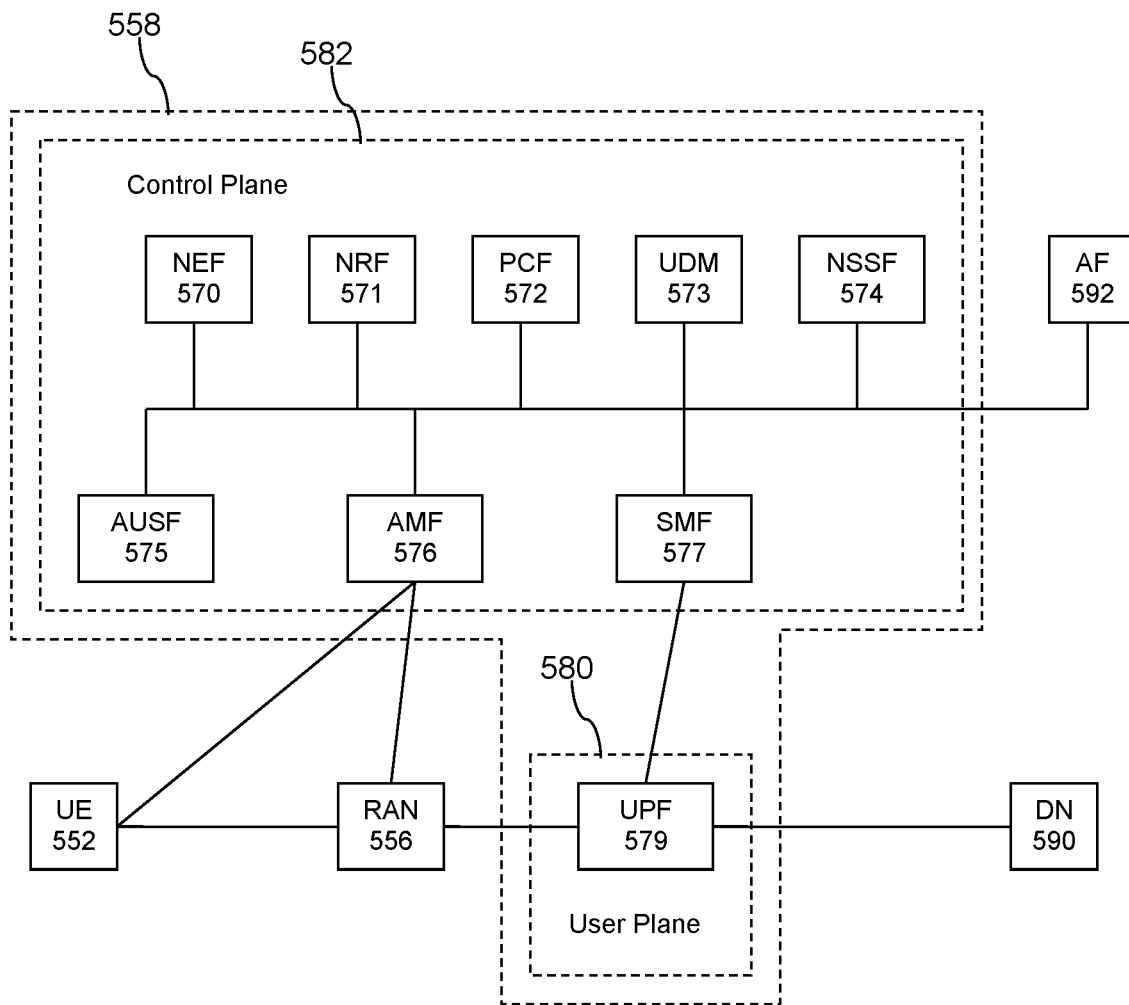

Turning now to FIG. 5A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
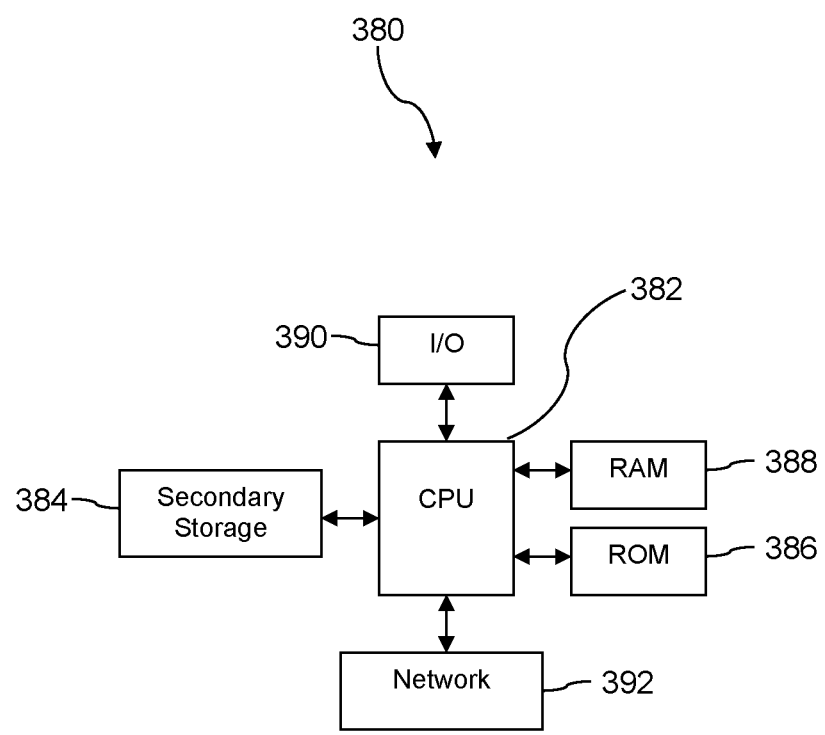
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A method for on-demand cell site inventory update retrieval in a telecommunications carrier network comprising a plurality of cell sites and a radio access network (RAN), comprising:

maintaining, by an inventory application executing on a computer system in the telecommunications carrier network, a master inventory including data regarding a plurality of components in each of the cell sites in the RAN;

obtaining, by the inventory application, a request for an inventory update associated with a cell site of the plurality of cell sites, wherein the request indicates a component in the cell site;

receiving, by the inventory application from an operational support system (OSS) in the telecommunications carrier network, updated component data associated with the component in the cell site, wherein the updated component data comprises a most up-to-date version of data describing the component;

identifying, by the inventory application, a related component of the component based on a component record in the master inventory, wherein the component record is associated with the component and identifies the related component, and wherein the related component is at least one of communicatively coupled to the component in the cell site, installed at the component in the cell site, configured on a logical path with the component on the cell site, located proximate to the component on the cell site, or affected by the component in the cell site;

receiving, by the inventory application, updated related component data associated with the related component in the cell site, wherein the updated related component data comprises a most up-to-date version of data describing the related component; and updating, by the inventory application, in the master inventory the component record associated with the component to include the updated component data and a related component record associated with the related component to include the updated related component data when the master inventory excludes the updated component data associated with the component and the updated related component data associated with the related component.

2. The method of claim 1, wherein the request for the inventory update is received from a field engineer at the cell site or an operator at a network operations center (NOC) associated with the telecommunications carrier network.

3. The method of claim 1, wherein the component is a network card at the cell site, and wherein the related component is a firmware of the network card.

4. The method of claim 1, wherein the updated component data is cached at the OSS.

5. The method of claim 1, further comprising retrieving, by the OSS, the updated component data from the component.

6. The method of claim 1, further comprising updating, by the inventory application, in the master inventory, a second set of records associated with different components in a different cell site in parallel while updating, in the master inventory, the at least one of the components record or the related component record.

7. A telecommunication network management system implemented in a telecommunications carrier network comprising a plurality of cell sites and a radio access network (RAN), wherein the telecommunication network management system comprises:
   one or more memories configured to store a master inventory including data regarding a plurality of components in each of the cell sites in the RAN;
   one or more processor coupled to the one or more memories; and
   an inventory application, stored on the one or more memories that, when executed by the one or more processors, causes the inventory application to be configured to:
      determine that a trigger event has occurred to obtain updated component data for a first component of a related component group in a cell site of the telecommunications carrier network;
      receive updated component data associated with the first component in the cell site, wherein the updated component data comprises a most up-to-date version of data describing the first component, and wherein the updated component data is received from at least one of:
         an operational support system (OSS) in the telecommunications carrier network, or
         a state data store configured to maintain up-to-date data describing a plurality of components in the cell site;
      identify a related component of the first component in the related component group based on a component record in the master inventory, wherein the component record is associated with the first component and identifies the related component;
      receive updated related component data associated with the related component, wherein the updated related component data comprises a most up-to-date version of data describing the related component; and
      update, in the master inventory, the component record associated with the first component to include the updated component data and a related component record associated with the related component to include the updated related component data when the master inventory excludes the updated component data associated with the one or more components.

8. The system of claim 7, wherein the trigger event comprises at least one of:
   a request for an inventory update associated with the cell site and indicating the first component being received, or
   an indication of a maintenance action being performed at the first component in the cell site being received.

9. The system of claim 7, wherein the state data store maintains a configured state, an expected state, and an operational state for each of the components in the cell site, wherein the configured state indicates a state of a component at configuration, wherein an expected state indicates a current expected state of the component, wherein the operational state indicates an actual current operation state of the component, wherein the updated component data, when received from the state data store, comprises at least one of the configured state, the expected state, or the operational state of the first component, and wherein the updated related component data, when received from the state data store, comprises at least one of the configured state, the expected state, or the operational state of the related component.

10. The system of claim 7, wherein each of the related components in the related component group is at least one of:
   communicatively coupled to the primary component,
   installed at the primary component,
   configured on a logical path with the primary component,
   located proximate to the primary component within the cell site, or
   affected by the primary component.

11. The system of claim 10, wherein the updated related component data describing the related component is received from a different OSS in the telecommunications carrier network.

12. The system of claim 7, wherein when the updated component data is received from the OSS, the inventory application is further configured to transmit a command to the OSS to retrieve the updated component data for the first component, and wherein, in response to the command, the OSS is configured to:
   transmit a query to the first component in the cell site for the updated component data;
   receive the updated component data from the first component; and
   transmit the updated component data to the inventory application.

13. The system of claim 7, wherein when the updated component data is received from the state data store, the inventory application is further configured to transmit a command to the state data store to retrieve the updated component data for a the first component, and wherein, in response to the command, the state data store is configured to:
   perform a look-up in a database storing the up-to-date data describing the first component in the cell site to retrieve the updated component data for the first component; and
   transmit the updated component data to the inventory application.

14. A method for on-demand cell site inventory update retrieval in a telecommunications carrier network comprising a plurality of cell sites and a radio access network (RAN), comprising:
   determining, by an inventory application executing on a computer system in the telecommunications carrier network, that a trigger event has occurred to obtain updated component data for a first component of a related component group in a cell site of the telecommunications carrier network;

receiving, by the inventory application, updated component data associated with the first component in the cell site, wherein the updated component data comprises a most up-to-date version of data describing the first component, and wherein the updated component data is received from at least one of:
   an operational support system (OSS) in the telecommunications carrier network, or
   a state data store configured to maintain up-to-date data describing a plurality of components in the cell site;
storing, in a memory, a master inventory including data regarding a plurality of components in each of the cell sites in the RAN, wherein the master inventory comprises a component record associated with the first component;
identifying a related component of the first component in the related component group based on the component record in the master inventory, wherein the component record identifies the related component;
receiving updated related component data associated with the related component, wherein the updated related component data comprises a most up-to-date version of data describing the related component; and
updating, by the inventory application, in the master inventory, the component record associated with the first component to include the updated component data and a related component record associated with the related component to include the updated related component data when the master inventory excludes the updated component data associated with the one or more components.

15. The method of claim 14, wherein the trigger event comprises at least one of:
   receiving, by the inventory application, a request for an inventory update associated with the cell site and indicating the first component, or
   receiving, by the inventory application, an indication of a maintenance action being performed at the first component in the cell site.

16. The method of claim 14, wherein the state data store maintains a configured state, an expected state, and an operational state for each of the components in the cell site.

17. The method of claim 14, wherein each of the related components in the related component group is at least one of:
   communicatively coupled to the primary component,
   installed at the primary component,
   configured on a logical path with the primary component,
   located proximate to the primary component within the cell site, or
   affected by the primary component.

18. The method of claim 17, wherein the updated related component data describing the related component is received from a different OSS in the telecommunications carrier network.

19. The method of claim 14, wherein when the updated component data is received from the OSS, the method further comprises:
   transmitting, by the inventory application, a command to the OSS to retrieve the updated component data for the first component; and
   in response to the command:
     transmitting, by the OSS, a query to the first component in the cell site for the updated component data;
     receiving, by the OSS, the updated component data from the first component; and
     transmitting, by the OSS, the updated component data to the inventory application.

20. The method of claim 14, wherein when the updated component data is received from the OSS, the method further comprises:
   transmitting, by the inventory application, a command to the state data store to retrieve the updated component data for the first component; and
   in response to the command:
     extracting, by the OSS, the updated component data from a cache communicatively coupled to the OSS; and
     transmitting, by the OSS, the updated component data to the inventory application.

\* \* \* \* \*